United States Patent Office 3,005,024
Patented Oct. 17, 1961

3,005,024
1:3:3-ACETALDEHYDE-AMMONIA ADDUCTS
OF TETRACYCLINE AND ITS ANALOGS
Hans H. Rennhard, Lyme, Conn., assignor to Chas. Pfizer
& Co., Inc., Brooklyn, N.Y., a corporation of Delaware
No Drawing. Filed May 4, 1959, Ser. No. 810,560
8 Claims. (Cl. 260—559)

This invention is concerned with a process for the preparation of certain novel organic compounds and with the new compounds thus prepared. In particular, it is concerned with the preparation of certain biologically active tetracycline antibiotic compounds.

The term "tetracycline antibiotics" includes tetracycline, 7-chlortetracycline, 7-bromotetracycline, 12a-deoxytetracycline, 6-demethyltetracycline, their 5a,6-anhydro derivatives 5-hydroxytetracycline, 5-hydroxy-12a-deoxytetracycline, 6-demethyl-6-deoxy-tetracycline, 6-deoxytetracycline, 6,12a-dideoxy-tetracycline, 6-demethyl-6,12a-dideoxytetracycline, 6-demethyl-12a-deoxytetracycline. The aforementioned 12a-deoxytetracyclines are novel compounds and may be prepared in accordance with the method disclosed in Union of South African Patent 3,651/58 as sealed April 29, 1959. In general, the preparation method of this patent involves contacting the corresponding tetracycline antibiotic having a 12a-hydroxy substituent with metallic zinc in an aqueous alkaline solution so as to cause reduction of the 12a-hydroxy substituent and, if desired, reacting the 12a-deoxytetracycline with an acid to form the acid addition salt.

The tetracycline antibiotics are difficulty soluble in water over a broad pH range. In order to obtain forms of these antibiotics having adequate solubility for pharmaceutical purposes, the salts of these antibiotics with acids and bases have been resorted to. However, these salts suffer from the disadvantage of existing as stable entities in aqueous solution only at extreme pH values which severely limits their usefulness via injection.

Numerous proposals have been suggested for improving the solution characteristics of the tetracycline antibiotics; for example, it has been proposed to overcome the occasionally poor local compatibility on intramuscular injection due, in part, to precipitation of tetracycline from solution in the buffered body fluids, by the addition of local anesthetics. It has also been proposed to utilize various organic acids and metal salts to stabilize aqueous solutions of these antibiotics and to improve their absorption by the tissues.

It has now been found that the acetaldehyde-ammonia reagent, preformed or formed in situ, is capable of combining with the tetracycline antibiotics to yield novel biologically active substances which have certain advantages in their higher solubility in water at slightly alkaline pH values. The exact mode of combination or the exact point of attachment of the acetaldehyde-ammonia reagent to the tetracycline antibiotic has not been established. However, the valuable products of the present invention are distinct chemical compounds in which the tetracycline antibiotic and acetaldehyde-ammonia reagent are present in a 1:1 mole ratio. The empirical formulae of these new compounds correspond to the combined total of the empirical formulae of the components. In view of this, the products of this invention can be adequately described as 1:1 adducts of the tetracycline antibiotics.

The acetaldehyde-ammonia reagent employed for the formation of the novel compounds of the present invention is believed to have the general empirical structure of an α-amino alcohol. However, molecular weight determinations indicate the product is more complex with 3 molecules each of acetaldehyde and ammonia involved in the actual structure. Its structure, as suggested by the investigation of Aschan, Ber., 48, 874 (1915) is believed to be $CH_3.CH(OH).NH.CH(CH_3).NH.CH(CH_3).NH_2 + 2H_2O$ in which the mole ration of acetaldehyde:ammonia is 3:3.

The acetaldehyde-ammonia reagent is readily prepared by the action of concentrated aqueous ammonia on acetaldehyde or by the action of dry ammonia on an ethereal solution of acetaldehyde. For the purposes of this invention it is advantageous to use the latter method of preparation since the adduct is easily obtained in an anhydrous or substantially anhydrous condition and can be used directly in the formation of the novel products of this invention without further drying. The small amount of ether present in the finished acetaldehyde-ammonia reagent may, if desired, be removed before reaction with the tetracycline antibiotic. However, this is not necessary.

The process of this invention is carried out by treating the tetracycline antibiotic in an anhydrous or substantially anhydrous inert solvent, that is, a solvent in which the two reactants are at least moderately soluble, with about one equivalent of acetaldehyde-ammonia reagent. Solvents such as tetrahydrofuran, dioxane, diethylene glycol monomethyl ether and the homologous monoethyl and monobutyl ether and alcohols, such as, methyl, ethyl, propyl, isopropyl, butyl serve as solvent systems. Tetrahydrofuran is the preferred solvent because of its relatively low boiling point which permits easy removal by evaporation. The mole ration of tetracycline antibiotic to acetaldehyde-ammonia reagent may be greater or less than 1. However, since there is no advantage to using molar ratios of reactants greater or less than 1, it is preferred to employ stoichiometric ratios of reactants. The fact that the same products are produced, irrespective of the molar ratios of reactants used points to the existence of these novel compounds as distinct entities.

The reaction is preferably conducted at about room temperature, that is, from about 15° C. to about 25° C., with stirring until all solids have dissolved after which it is allowed to stand until precipitation of the product is complete or substantially complete. Higher or lower temperatures, that is, from about 65° C. to about 0° C. can also be used with no detrimental effects. The rate of the reaction is dependent to some extent upon the temperature. Although temperatures above room temperature permit shorter reaction times, a temperature of about room temperature is preferred since it affords somewhat higher yields.

The acetaldehyde-ammonia reagent, a relatively unstable compound, is best used when freshly prepared. However, the freshly prepared product is not necessary for the attainment of essentially quantitative yields. The commercially available product performs satisfactorily in this process.

The process of this invention utilizing the in situ formation of the acetaldehyde-ammonia reagent is carried out by the addition of acetaldehyde followed by ammonia to a solution of a tetracycline antibiotic. The acetaldehyde and ammonia are preferably added to a solution of the tetracycline antibiotic on an equivalent basis; that is, 3 moles each of acetaldehyde and ammonia per mole of tetracycline antibiotic. The acetaldehyde and ammonia should be employed in equimolar proportions since the use of ammonia in excess of the acetaldehyde results in reduced yields. The mole ratio of acetaldehyde:ammonia to tetracycline antibiotic used can be greater or less than 3:3 to 1. However, as when using the preformed acetaldehyde+ammonia reagent, it is preferred to employ stoichiometric ratios of reactants. The product of this invention thus consist of tetracycline antibiotic:acetaldehyde: ammonia in a 1:3:3 mole ratio.

The product may be recovered from the reaction mixture by evaporation of the solvent at a temperature below the decomposition temperature of the product. Reduced pressure or atmospheric pressure may be used. Alternatively, the product may be recovered by filtration. The filtrate can then be evaporated to recover additional product, or, recycled to the succeeding batch.

The tetracycline antibiotic-acetaldehyde-ammonia adducts thus prepared are highly soluble in water with formation of slightly alkaline solutions. The pH value of a given solution, of course, depends upon the amount of the tetracycline antibiotic acetaldehyde-ammonia adduct present. In the case of the tetracycline acetaldehyde-ammonia adduct, a 5% solution has pH 8.2 and a 25% solution has pH 8.6.

The compounds of this invention undergo a slow hydrolysis in water. The rate of hydrolysis varies, of course, with the temperature; the higher the temperature, the faster the rate. The extent of hydrolysis of a given solution depends upon the concentration; the more dilute the solution, the more extensive the degree of hydrolysis.

As already indicated, the products of this invention possess appreciable activity against a variety of pathogenic organisms. The biological activity of tetracycline acetaldehyde-ammonia adduct is given in Table I. The tests were conducted under standard conditions.

TABLE I.—BIOLOGICAL ACTIVITY OF TETRACYCLINE ACETALDEHYDE-AMMONIA ADDUCT

| Organism: | Tetracycline [1] acetaldehyde-ammonia |
|---|---|
| Micrococcus pyogenes var. aureus | 0.78 |
| Streptococcus pyogenes | <0.39 |
| Streptococcus faecalis | 0.78 |
| Diplococcus pneumoniae | 0.78 |
| Erysipelothrix rhusiopathiae | 0.78 |
| Corynebacterium diphtheriae | 3.12 |
| Listeria monocytogenes | 1.56 |
| Bacillus subtilis | <0.39 |
| Lactobacillus casei | 3.12 |
| Bacterium ammoniagenes | <0.39 |
| Aerobacter aerogenes | 1.56 |
| Escherichia coli | 1.56 |
| Salmonella typhosa | 1.56 |
| Samonella pullorum | 0.78 |
| Klebsiella pneumoniae | 3.12 |
| Neisseria gonorrhoeae | <0.39 |
| Haemophilus influenzae | <0.39 |
| Shigella sonnei | 1.56 |
| Brucella bronchiseptica | <0.39 |
| Pasteurella multocida | 0.39 |
| Mycobacterium 607 | 0.39 |
| Mycobacterium berolinense | 0.39 |
| Antibiotic resistant strains of Micrococcus pyogenes var. aureus: | |
| #400 | 50 |
| #376 | 200 |
| Phytomonas phaseolicola | 1.56 |
| Xanthomonas vesicatoria | 0.39 |

[1] The values reported are the minimum inhibitory concentrations (MIC) in mcg./ml.

The compounds of this invention have certain advantages over the parent antibiotic compounds in that they are more soluble in water than are the parent compounds. They are, therefore, of value for the preparation of intramuscular and intravenous dosage forms.

It has been established that these compounds produce appreciable antibiotic levels in the blood serum over a considerable period after intramuscular administration. In addition, good Escherichia coli activity has been detected in urine excretions. The toxicity of these novel products is not appreciably different than that of the tetracycline antibiotics themselves.

Because of the comparable toxicity levels of the tetracycline antibiotic-acetaldehyde-ammonia adducts of this invention to the parent tetracycline antibiotics, the compounds of this invention can be used in dosage forms similar to those in which the parent compounds are used. They may, for example, be incorporated with various suitable pharmaceutical carriers in dosage forms which are of value for administration to animals in the treatment of a variety of infections. Essentially any inert pharmaceutical carrier may be used, that is, any substance which is useful for the preparation of dosage forms and which does not tend to inactivate the antibiotic substance. Thus, the products may be incorporated into capsules with various inert materials or these compounds may be converted into tablets by incorporation with certain tableting agents, such as gums, either natural or synthetic, sweetening agents, coating agents and so forth. Alternatively, the products of the present invention may be utilized in the form of injectable preparations. For administration by the intramuscular route, the medium for the active compounds may be water, saline, non-toxic vegetable oils, and other materials of this nature. For administration by the intravenous route, care must be taken to make certain that a clear solution in water, saline, or glucose solution is prepared. It should be noted that, upon prolonged storage in aqueous solution, the antibiotic activity may be lost to an appreciable extent and there may be a tendency for solid materials to separate. Certain other dosage forms, such as, ointments or salves, may be prepared with a suitable base, preferably a non-hydrophilic base, such as, petroleum jelly and substances of this nature.

The following examples are given by way of illustration, and are not to be regarded as limitations of this invention, many variations of which are possible without departing from the spirit or scope thereof.

*Example I*

TETRACYCLINE ACETALDEHYDE-AMMONIA ADDUCT

Tetracycline (8.88 g.), tetrahydrofuran (40 ml.) and acetaldehyde-ammonia reagent (3.68 g.), a 1:1 molar ratio, were mixed together at room temperature until solution was complete. Stirring was discontinued and the mixture allowed to stand. Within 1.5 to 2.0 hours, a gelatinous precipitate formed. After 4 hours the precipitate was filtered off, washed with tetrahydrofuran, ether and dried to give a 90% yield. Evaporation of the filtrate and washings under reduced pressure and at 30° C.–40° C. yields additional product for a total yield of 100%.

Alternatively, the product can be isolated by evaporation of the reaction mixture without prior filtration.

The product is soluble in water to about 300 mg./ml. Tetracycline acetaldehyde-ammonia gave a biological activity of 745 mcg./mg. when assayed by the standard *Klebsiella pneumoniae* turbidimetric test. Its ultraviolet spectrum is identical to that of tetracycline.

The same product is obtained when dioxane, methyl alcohol, isopropyl alcohol or diethylene glycol monomethyl ether are used as solvents.

*Example II*

Using the procedure of Example I, 5-hydroxytetracycline, 7-bromotetracycline and 7-chlortetracycline are converted to the corresponding acetaldehyde-ammonia adducts. The ultraviolet spectra of the adducts are identical to the ultraviolet spectra of the parent antibiotics.

*Example III*

Following the procedure of Example I, tetracycline (20 g.), tetrahydrofuran (90 ml.) and acetaldehyde-ammonia (8.29 g.) were mixed together to give a quantitative yield of the adduct.

Paper chromatograms using MacIlvaine's Buffer, pH 3.5 (0.2 M $Na_2HPO_4$ and 0.1 M citric acid) as immobile phase and nitromethane:chloroform:pyridine:n-butanol (20:10:3:5) as mobile phase exhibited three spots due to hydrolysis of the compound.

Example IV

Following the procedure of Example I, 12a-deoxytetracycline, 5a,6 - anhydro-6-demethyltetracycline, 5a,6-anhydrotetracycline, 5a,6-anhydro-12a-deoxytetracycline, 5-hydroxy-12a-deoxytetracycline, 5a,6-anhydro-7-chlorotetracycline, 5a,6 - anhydro - 7 - bromotetracycline, 6-demethyltetracycline, 6 - deoxytetracycline, 6 - demethyl-6-deoxytetracycline, 6 - demethyl - 12a - deoxytetracycline, 6,12a-dideoxytetracycline, 6-demethyl-6,12a-dideoxytetracycline are converted to the corresponding acetaldehyde-ammonia adducts.

Example V

Tetracycline (8.88 g.), tetrahydrofuran (40 ml.), and acetaldehyde-ammonia (4.42 g.), a 1:1.2 molar ratio, were mixed together and worked up as described in Example I using dioxane as solvent. The product was found identical to the product of Example I.

Example VI

Tetracycline (8.88 g.), tetrahydrofuran (40 ml.) and acetaldehyde-ammonia (2.76 g.), a 4:3 molar ratio, were mixed together and worked up as described in Example I. The product was identical to the product of Example I.

Repetition of this reaction using diethylene glycol monobutyl ether as solvent yields the same product.

Example VII

To a solution of 8.88 g. tetracycline in 40 ml. of tetrahydrofuran at room temperature there was added 2.66 g. of acetaldehyde followed by 1.02 g. of anhydrous ammonia. The mixture was stirred until solution was complete and then worked up according to the procedure of Example I. The product isolated was identical to the product of Example I.

In like manner, beginning with the appropriate tetracycline antibiotic, the following adducts are prepared: 5 - hydroxytetracycline, 7 - chlortetracycline, 12a - deoxytetracycline and 5a,6-anhydrotetracycline - acetaldehyde-ammonia adducts.

Example VIII

Additional quantities of tetracycline:acetaldehyde:ammonia adduct are prepared according to the procedure of Example VII but using mole ratios of tetracycline:acetaldehyde:ammonia of 1:3.5:3.5 and 1:2.5:2.5.

What is claimed is:

1. The process which comprises dissolving in a substantially anhydrous inert solvent a mixture of a tetracycline antibiotic selected from the group consisting of tetracycline, 7 - chlorotetracycline, 7 - bromotetracycline, 12a-deoxytetracycline, 6 - demethyltetracycline, the 5a,6-anyhdro derivatives thereof, 5 - hydroxytetracycline, 5-hydroxy-12a-deoxytetracycline, 6-demethyl-6-deoxytetracycline, 6-demethyl-12a-deoxytetracycline, 6-deoxytetracycline, 6,12a-dideoxytetracycline, and 6-demethyl-6,12a-dideoxytetracycline with acetaldehyde and ammonia at about room temperature for a period of up to about 4 hours to cause the mixture to react to form an adduct of the tetracycline antibiotic with the acetaldehyde and the ammonia.

2. A process as claimed in claim 1 wherein the tetracycline antibiotic is tetracycline.

3. A process as claimed in claim 1 wherein the tetracycline antibiotic is 5-hydroxy tetracycline.

4. A process as claimed in claim 1 wherein the tetracycline antibiotic is 7-chlortetracycline.

5. The adduct of a tetracycline antibiotic selected from the group consisting of tetracycline, 7-chlorotetracycline, 7-bromotetracycline, 12a - deoxytetracycline, 6-demethyltetracycline, the 5a,6-anhydro derivatives thereof, 5-hydroxytetracycline, 5-hydroxy-12a-deoxytetracycline, 6-demethyl-6-deoxytetracycline, 6-demethyl - 12a-deoxytetracycline, 6-deoxytetracycline, 6,12a-dideoxytetracycline, 6-demethyl-6,12a-dideoxytetracycline with acetaldehyde and ammonia in which the tetracycline antibiotic; acetaldehyde and ammonia are in the mole ratio of 1:3:3.

6. The 1:3:3 tetracycline-acetaldehyde-ammonia adduct.

7. The 1:3:3 5 - hydroxytetracycline-acetaldehyde-ammonia adduct.

8. The 1:3:3 7-chlortetracycline - acetaldehyde - ammonia adduct.

References Cited in the file of this patent

UNITED STATES PATENTS 2,873,276    Blase _____ Feb. 10, 1959

OTHER REFERENCES

Aschin: Ber., vol. 48, page 874 (1905).